United States Patent [19]

Wanzke

[11] Patent Number: 4,762,062
[45] Date of Patent: Aug. 9, 1988

[54] MECHANICAL PRESS

[76] Inventor: Manfred Wanzke, Am Sportfeld 3, D-8751 Niedernberg, Fed. Rep. of Germany

[21] Appl. No.: 24,856

[22] Filed: Mar. 17, 1987

Related U.S. Application Data

[63] Continuation of Ser. No. 765,668, Aug. 14, 1985.

[30] Foreign Application Priority Data

Aug. 18, 1984 [DE] Fed. Rep. of Germany ....... 3430514

[51] Int. Cl.⁴ .............................................. B30B 1/10
[52] U.S. Cl. ................................... 100/280; 100/281; 72/112; 72/406
[58] Field of Search ............... 100/280, 281, 284, 285, 100/292; 72/67, 112, 406, 424, 450

[56] References Cited

U.S. PATENT DOCUMENTS 3,768,289 10/1973 Mink ..................................... 72/406
4,520,527 6/1985 Maggio et al. ..................... 15/235.8

FOREIGN PATENT DOCUMENTS 2834201 2/1980 Fed. Rep. of Germany ........ 72/406

Primary Examiner—Harvey C. Hornsby
Assistant Examiner—Corinne M. Reinckens

[57] ABSTRACT

This invention relates to a mechanical press comprising a shaft 1 coupled to a drive, which shaft 1 is supported in a yoke 2 at its end opposite to the drive, and a connecting rod 9, the lower end of which is rotatably connected with a slide 11 which is guided and movable relative to the press table 13. The two connecting rod ends 8, 10 can be rotatably connected with the slide 11 or journal 3, respectively, via cross-pieces or universal joints, which in turn is supported in the front end of the shaft 1, the rotation axis 4 of which extending in parallel to the rotation axis 5 of the shaft 1, however offset in relation thereto, and it being possible that the yoke 2 can be swivelled about an axis extending in parallel to the press table 13.

20 Claims, 3 Drawing Sheets

MECHANICAL PRESS

This application is a continuation of application Ser. No. 765,668, filed Aug. 14, 1985.

BACKGROUND OF THE INVENTION

1. Field of the Invention

This invention relates to a mechanical press, comprising a shaft coupled to a drive. The shaft is supported in a yoke at its end opposite to the drive, and a connecting rod. The lower end of the connecting rod is rotatably connected with a slide. The slide is guided and movable relative to the press table upon which the workpiece is positioned.

2. Prior Art

According to the prior art such presses are known in the form of eccentric presses and crank presses. In crank presses a shaft, having a gap is driven, on which the connecting rod is supported, thereby causing a reciprocating movement of the slide upon rotation of the shaft. The eccentric press is characterized in that the end of a shaft is provided with a disk having an eccentric. The disk, in turn, is connected with the connecting rod. The eccentricity of the fixing defines half of the height of the slide stroke. In both types of presses it is a disadvantage that during operation of the press, the shaft is radially loaded with high forces. These forces are necessarily received by the bearings of the shaft and lead to a bending thereof. Both factors are disadvantageous, since the maximum force which can be exerted on the workpiece, thus reducing the efficiency of the press, is restricted considerably. Very high forces have to be recieved by the bearings guiding the shafts.

SUMMARY OF THE INVENTION

Thus, it is an object of the present invention to provide an improved mechanical press so that the load or force on the shaft is reduced radially during operation of the press. According to the invention this and related objects are accomplished by a mechanical press having two connecting rod ends which can be rotated about at least two intersecting axes which are essentially perpendicular to the connecting rod shaft in a plane. The lower connecting rod end is connected with the slide and the upper connecting rod end is connected with a journal. The journal is supported in the front end of the shaft and has a rotation axis which is parallel to the shaft, but offset in relation thereto. The rotatability of the connecting rod ends, in the manner indicated, can be realized, for example, by using crosspieces or universal joints.

The function of the press according to the invention is as follows: the shaft is rotated about its axis by means of a drive. The front end of the journal is offset according to the precondition, i.e. eccentrically, moves and along a circular path and in a plane perpendicularly to the shaft. In general, the axis of the shaft is not vertical so that the journal moves in a plane which is inclined to the horizontal line and the deviation is taken as a measure for the stroke of the slide. If the axis of the shaft is in a vertical position the journal then moves in a horizontal plane - the stroke of the slide becomes zero.

Due to the rotatable support of the journal in the shaft, the rotation thereof is not transmitted to the connecting rod. As described, the upper connecting rod end moves in a plane generally inclined to the horizontal line; the deviation thereof describing the stroke and the remaining components of movement describing a circular motion in the horizontal line, i.e. perpendicular to the connecting rod shaft. Due to the rotatable support of the two connecting rod ends about at least two intersecting axes (being approximately perpendicular to the connecting rod shaft in a plane), the comparatively complex movement of the journal is converted into a reciprocating movement of the slide. The indicated rotatable support of the connecting rod ends can be realized in that they are connected with a cross-piece or a universal joint which, in turn, is connected with either the journal (upper connecting rod end) or the slide (lower connecting rod end).

The column, frame or body of the press is designed in a generally known manner. As in most cases, a slide plate can be mounted to the bottom of the slide.

A large variety of advantages can be achieved by the invention: One of the main advantages is that the forces exerted on the shaft during press operation do not occur in radial direction only, as is the case with conventional presses, but also in an axial direction to a considerable extent which depends on and is determined by the inclination of the shaft to the vertical line. In this connection, it is of importance, that for generating the press a stroke not equal to zero is required. This stroke can only be realized by having the yoke being swivelled, i.e. the shaft is inclined to the horizontal line, with the shaft consequently receiving considerable axial forces.

The major reason for the considerably higher load capacity of the press according to the invention is that forces acting axially on the shaft can be received and compensated for much better. This is in contrast to permitting radial forces to be received by the bearings. The bearings are comparatively sensitive to such radial forces and can be exposed to such loads only to a minor extent. What follows therefrom is that the higher the load capacity, the higher the stroke of the slide. Further advantages of the invention are that such a press can be of a comparatively small and compact design. Finally, another advantage is that the invention is also suited, in particular, for machines with high pressing frequences.

In another embodiment. the yoke can be swivelled and the swivelling axis extends through the rotation axis of the upper connecting rod end whenever the latter is in the bottom position during rotation of the shaft. Due to this support, the journal and the upper connecting rod end move in planes which are more or less inclined to the horizontal line, the deviations thereof determining the stroke of the slide. In the special case of a vertical shaft axis, in which the upper connecting rod end and the journal move in a horizontal plane, the stroke of the slide is zero. It is decisive that the swivelling axis extends through the yoke so that it coincides with the rotation axis of the upper connecting rod end, provided the latter reaches its bottom position, i.e. a position closest to the workpiece, when rotating about the shaft axis in a plane. In this position the slide is in its bottom dead center. The decisive advantage of this arrangement is that upon swivelling the yoke, the bottom dead center of the slide is maintained in every position despite changing the stroke. It is self-evident that the top dead center will then change. If the axis extended at another portion of the yoke, a swivelling movement would cause deviation not only of the top dead center but also of the bottom dead center, so that the slide would either ram the workpiece or not reach it at all. It would always be absolutely necessary that either the yoke or the press table would have to be adjusted vertically by means of an additional adjusting means so that these deviations could be compensated for. It is an advantage of the arrangement of the swivelling axis, according to the invention, that such additional adjusting means are rendered superfluous. Especially, when the slide is in the lower range of the bottom dead center, maximum forces are exerted on the yoke via the upper connecting rod end. These forces will produce an overturning moment, unless the swivelling axis of the yoke extends as indicated. In the case, according to the invention, these forces act centrally on the swivelling axis so that advantageously no overturning moments can occur. According to a preferred embodiment, one or both of the connecting rod ends are designed as balls and supported in a ball socket. In other words, the connecting rod is connected with the slide and/or shaft via ball joints. These allow considerably higher forces to be transmitted from the slide to the connecting rod and from the latter again to the journal and/or shaft and/or yoke. Another advantage is that, as compared to crosspieces, a ball joint permits an additional degree of freedom, i.e. that of the rotation of the connecting rod about its longitudinal axis. For reasons of simple design, the journal is designed as ball socket to support the upper connecting rod end and the slide is simultaneously designed as ball socket for the lower connecting rod end. In evaluation the inventive steps of this concept, it is generally assumed that very high forces of friction would occur if the ball head was only slightly moved or turned against the ball socket. It is assumed that these forces of friction would make impossible a use, as in the present case, in which the ball socket moves relative to the shaft, but does not move at all or only slightly relative to the ball head. Moreover, it would have been expected by those skilled in the art that excessive wear would occur in the range of the corresponding ball socket due to the swivelling or rotary movements of the connecting rod and/or the corresponding ball head. As through considerations show, such an opinion is not justified and the present design allows a maximum degree of power transmission and support and, at the same time, a high service life.

It is recommended, in particular, for slides with large areas to attach several connecting rods which should always be parallel to one another and arranged in series or in a plane. For four-point machines, it is preferable to arrange the connecting rods in square. Here too, every upper connecting rod end is supported in a journal and the latter, in turn, is supported on the front side of a shaft, in this embodiment the individual shafts are connected with one another, e.g. via toothed gearing.

BRIEF DESCRIPTION OF THE DRAWING

Further details, features and advantages of the invention can be taken from the following part of the description explaining in detail embodiments of the invention by means of the drawing, wherein similar reference numerals denote similar features throughout the several views, in which.

DESCRIPTION OF THE PREFERRED EMBODIMENT

Figure 1:
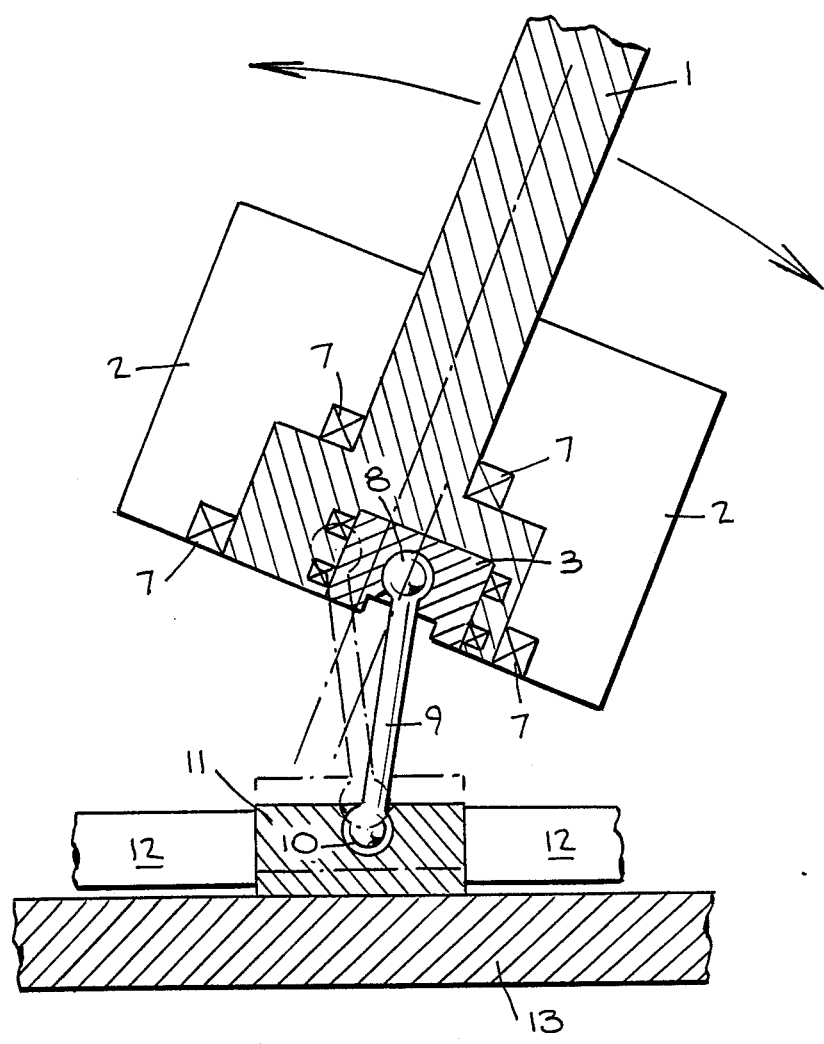
FIG. 1 is a basic side view, partly in cross-section, of the mechanical press according to the present invention.

FIG. 1 of the drawing shows the main part of the press according to the invention. It shows the lower end of a shaft 1 which is hatched to better distinguish it from the other parts. The upper end of the shaft (not shown) can be coupled with a drive. The shaft 1 is rotatably supported in a yoke 2 and has an inward hollow-cylindrical recess, at its front end, in which recess a journal 3, designed as a ball socket, is rotatably arranged. The rotation axis 4 of the journal, which is also the axis of symmetry of the hollow cylinder, extends in parallel to the rotation axis 5 of shaft 1 but offset is in relation thereto, i.e. eccentric. When the shaft 1 is rotated the journal 3 moves along a circular path about the rotation axis 5 in a plane which is perpendicular to the rotation axis 5 of shaft 1. Since the journal 3 is connected with the shaft 1 via bearings 6, the position of shaft 1, however, may remain stationary upon rotation of the shaft 1, apart from a displacement, i.e. the journal 3 does not necessarily have to rotate about its axis 4.

In like manner, the yoke 2 may remain stationary due to the bearings 7 even if the shaft 1 is rotated.

When the journal 3 is rotated about the axis 5 of shaft 1, the connecting rod end 8 therein is carried along, and the lower connecting rod end 10 is also correspondingly actuated via the connecting rod 9. The former is connected with slide 11 reciprocating between guides 12 via a ball socket. A slide plate or a press table 13 is arranged beneath slide 11 with which it cooperates in performing an operation on a workpiece arranged therebetween.

When journal 3 moves along said upper circular path about, rotation axis 5 of shaft 1 the upper connecting rod end 8 moves upwards due to the axis 5, inclined to the vertical line, so that by means of connecting rod 9, lower connecting rod end 10 and slide 11 connected, therewith are moved upwardly as well. The additional swivelling movements of the connecting rod 9, on the one hand, as against the journal 3 designed as a ball socket and, on the other hand, as against slide 11, are compensated by the ball joints produced in such a manner. What remains is that upon one rotation of the upper connecting rod end 8 about the rotation axis 5, slide 11 makes a single reciprocating movement. The speed of shaft 1 directly determines the number of strokes of slide 11. The stroke can be influenced by swivelling the yoke 2 and, thus, also by shaft 1. It is, for example, zero when shaft 1 is exactly vertical, since in such a case the plane passed through by the upper connecting rod end, 8 is horizontal, i.e. parallel to the press table 13 (see FIG. 2). The swivelling axis 14 of the yoke 2 will preferably extend in the rotation axis of the upper connecting rod end 8 when the latter is in its bottom position during rotation of shaft 1. Then, the bottom dead center of the slide is invariably maintained, even if the stroke changes. Accordingly no adjusting means are required for yoke 2 and/or press table 13 to avoid a ramming of the tool.

One of the major advantages of the present invention is that during operation of the press the forces exerted by the workpiece and transmitted to shaft 1 via connecting rod 9 do not only act radially but also axially to some extent; the forces being easily received and compensated for via yoke 2. As a result, a considerably higher load capacity is obtained together with a compact design and an infintely variable adjustment of the stroke of slide 11.

Figure 2:
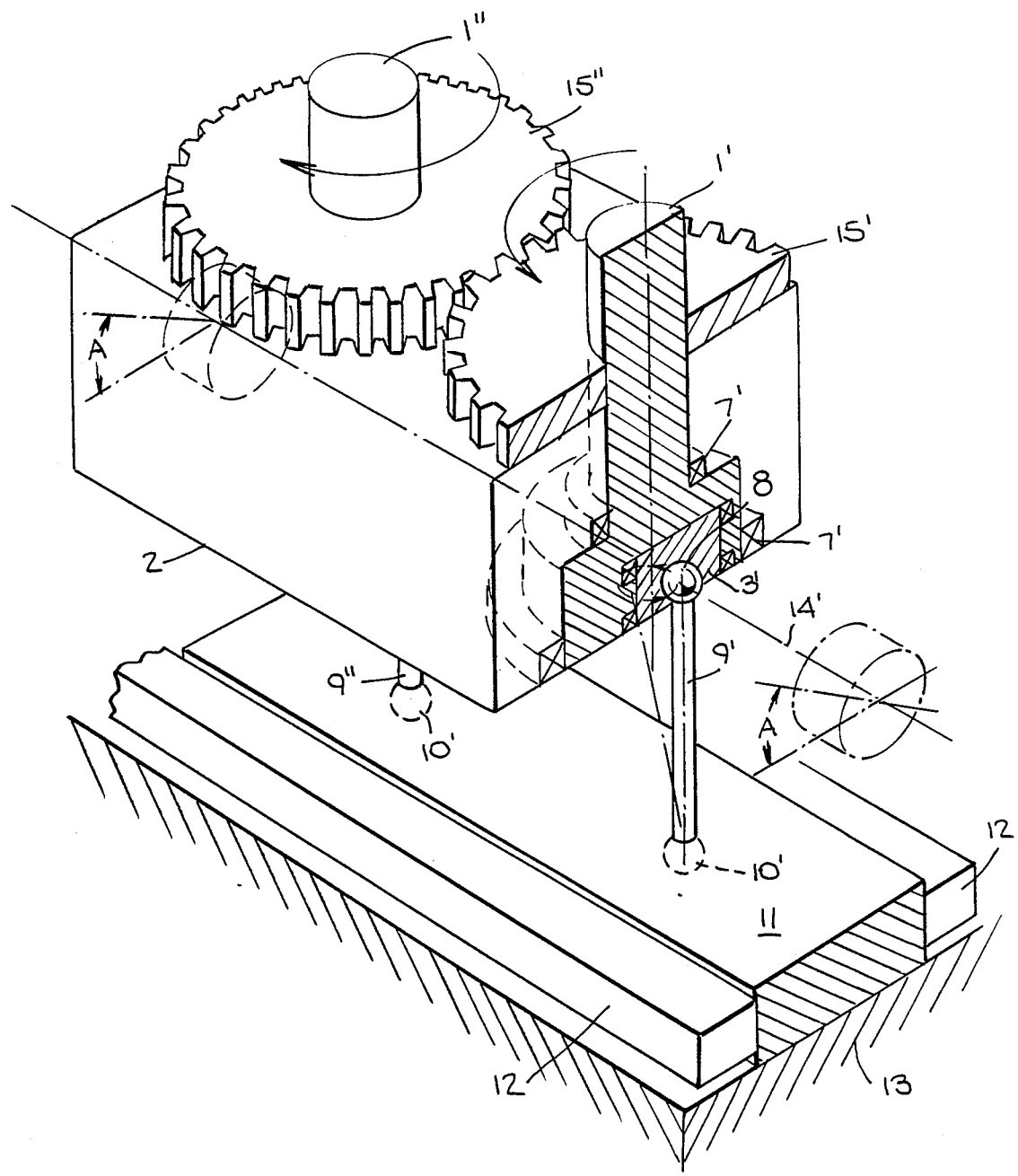
FIG. 2 is a perspective view, partly in cross-section, of a preferred embodiment of the invention.

FIG. 2, the features of which have been described above, shows an embodiment which is similar to the embodiment presented in FIG. 1, except that the embodiment of FIG. 2 has two parallel connecting rods 9' and 9" connected to slide 11 and supported in yoke 2, rather than a single connecting rod. The respective shafts 1' and 1" of connecting rods 9' and 9" are drivingly connected together by respective gears 15' and 15". Shaft 1' and its gear 15' are shown in cross-section in a manner similar to that presented in FIG. 1. The stroke of slide 11 may be altered by altering the inclination of yoke 2 (as shown by arrow A) with respect to the horizontal about axis 14. It is necessary that axis 14 coincides with upper connecting rod ends 8 when slide 11 is at its bottom limit of travel.

Figure 3:
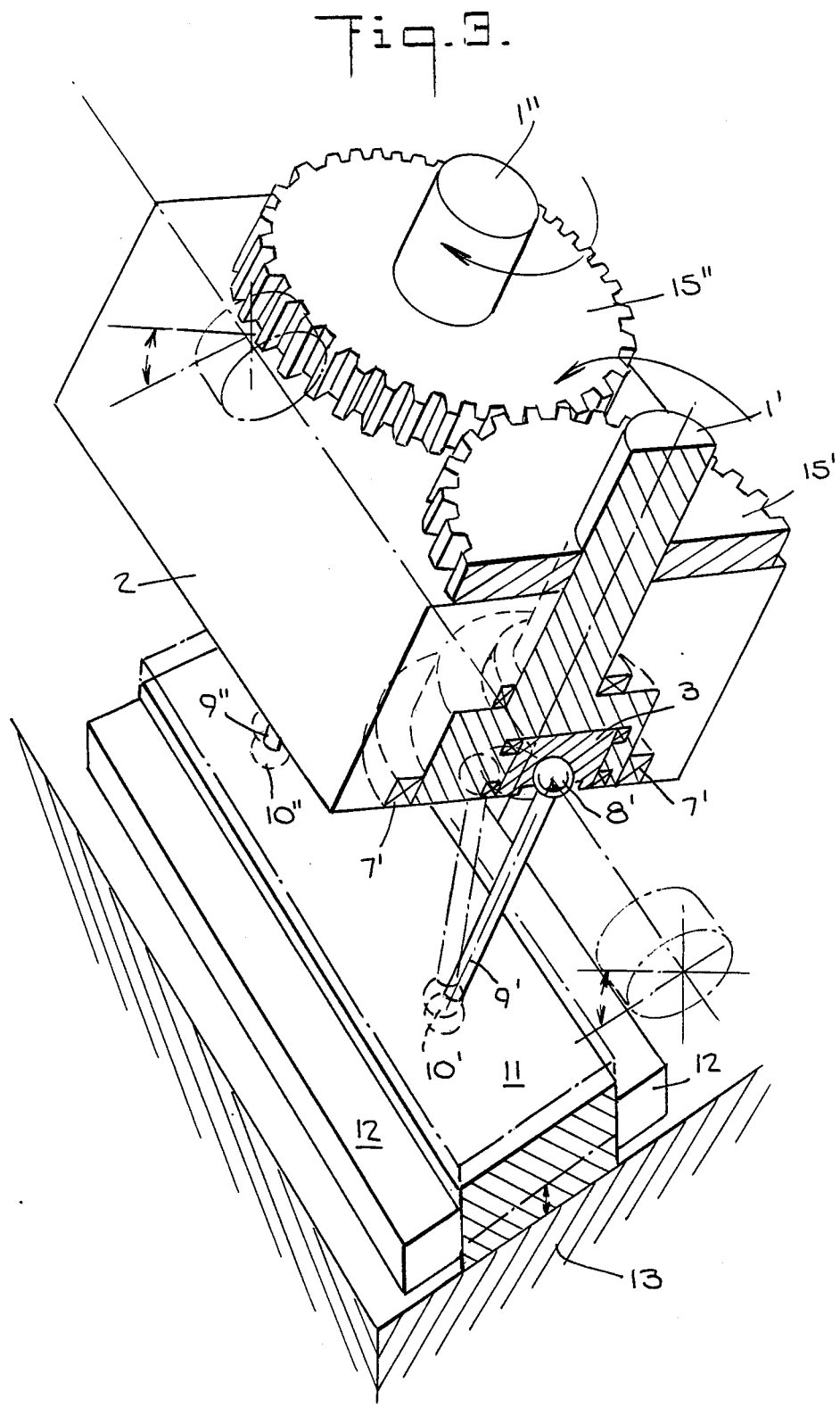
FIG. 3 is a perspective view, partly in cross-section, of the embodiment shown in FIG. 2, in a swivelled position.

FIG. 3 shows the embodiment of FIG. 2 wherein yoke 2 is swivelled. The swivelling axis 14 extends through the rotation axis 4 of the upper connecting rods 9' and 9". It is important that swivelling axis 14 extend through yoke 2 so that is coincides with rotation axis 4, The advantage of this arrangement is that upon swivelling yoke 2, the bottom dead center of slide 11 is maintained in every position despite changing the stroke. If axis 14 extended at another portion of yoke 2, a swivelling movement would cause deviation not only of the top dead center, but also of the bottom dead center so that the slide would either ram the workpiece or not reach it at all.

I claim:

1. A mechanical press, comprising:
    a drive;
    a yoke;
    a shaft coupled to said drive, said shaft being supported in said yoke at an end of said shaft which is opposite to said drive;
    a plurality of bearings;
    a journal being supported in a front end of said shaft via said plurality of bearings, said journal having a first rotation axis which is parallel to a second rotation axis of said shaft, but is offset in relation thereto;
    a slide which is guidable and movable relative to a press table; and,
    a connecting rod, having a lower connecting rod end and an upper connecting rod end, said upper connecting rod end being connected to said journal and said lower connecting rod end being rotatably connected to said slide, wherein said upper connecting rod end and said lower connecting rod end are capable of being rotated about at least two intersecting axes which are essentially perpendicular to said shaft in a plane so that forces exerted upon said shaft and said plurality of bearings during operation of said mechanical press are in a substantially axisl direction to said shaft rather than primarily in a radial direction to said shaft.

2. The mechanical press according to claim 1, wherein said yoke is capable of being swivelled with a swivelling axis extending through a rotation axis of said upper connecting rod end when said upper connecting rod end is in a bottom position during rotation of said shaft.

3. The mechanical press according to claim 1, wherein said upper connecting rod end is designed as a ball and is supported in a ball socket.

4. The mechanical press according to claim 1, wherein said lower connecting rod end is designed as a ball and is supported in a ball socket.

5. The mechanical press according to claim 1, further comprising a plurality of said connecting rods, each of said connecting rods of said plurality being parallel to one another and being connected with said slide and a plurality of said shafts, said plurality of said shafts being drivingly connected with one another.

6. The mechanical press according to claim 5, wherein said plurality of said connecting rods are positioned in series to one another.

7. The mechanical press according to claim 5, wherein said plurality of said connecting rods are positioned in a plane.

8. The mechanical press according to claim 7, wherein said plurality of said connecting rods are positioned in a square.

9. The mechanical press according to claim 5, wherein said plurality of said shafts are connected by a toothed gearing.

10. The mechanical press according to claim 6, wherein said plurality of said shafts are connected by a toothed gearing.

11. The mechanical press according to claim 7, wherein said plurality of said shafts are connected by a toothed gearing.

12. The mechanical press according to claim 8, wherein said plurality of said shafts are connected by a toothed gearing.

13. A mechanical press, comprising:
    a drive;
    a yoke;
    a plurality of shafts being drivingly connected to one another, said plurality of shafts being supported in said yoke at an end of said plurality of shafts which is opposite to said drive;
    a plurality of bearings;
    a journal being supported in a front end of said plurality of shafts via said plurality of bearings, said journal having a first rotation axis which is parallel to a second rotation axis of said shaft, but which is offset in relation thereto;
    a slide which is guidable and movable relative to a press table; and,
    a plurality of connecting rods with each of said connecting rods of said plurality being parallel to one another and each of said connecting rods having a lower connecting rod end and an upper connecting rod end, said upper connecting rod ends being connected to said journal and said lower connecting rod ends being rotatably connected to said slide and said plurality of said shafts, wherein said upper connecting rod ends and said lower connecting rod ends are capable of being rotated about at least two intersecting axes which are essentially perpendicular to said plurality of shafts so that forces exerted upon said shaft during operation of said mechanical press are in substantially axial direction to said plurality of shafts, rather than primarily in a radial direction to said plurality of shafts.

14. The mechanical press according to claim 13, wherein said plurality of said connecting rods are positioned in series to one another.

15. The mechanical press according to claim 13, wherein said plurality of said connecting rods are positioned in a plane.

16. The mechanical press according to claim 15, wherein said plurality of said connecting rods are positioned in a square.

17. The mechanical press according to claim 13, wherein plurality of shafts are connected by a toothed gearing.

18. The mechanical press according to claim 14, wherein said plurality of shafts are connected by a toothed gearing.

19. The mechanical press according to claim 15, wherein said plurality of shafts are connected by a toothed gearing.

20. The mechanical press, comprising:
a drive;
a yoke;
a plurality of shafts being drivingly connected to one another by a toothed gearing, said plurality of shafts being supported in said yoke at an end of said plurality of shafts which is opposite to said drive;
a plurality of bearings;
a journal being supported in a front end of said plurality of shafts via said plurality of bearings, said journal having a first rotation axis which is parallel to a second rotation axis of said shaft, but which is offset in relation thereto;
a slide which is guidable and movable relative to a press table; and,
a plurality of connecting rods with each of said connecting rods of said plurality being parallel to one another and each of said connecting rods having a lower connecting rod end and an upper connecting rod end, said upper connecting rod ends being connected to said journal and said lower connecting rod ends being rotatably connected to said slide and said plurality of said shafts, wherein said upper connecting rod ends and said lower connecting rod ends are capable of being rotated about at least two intersecting axes which are essentially perpendicular to said plurality of shafts so that forces exerted upon said shaft during operation of said mechanical press are in substantially axial direction to said plurality of shafts, rather than primarily in a radial direction to said plurality of shafts.

* * * * *